(12) United States Patent
Friedman

(10) Patent No.: US 6,773,105 B2
(45) Date of Patent: Aug. 10, 2004

(54) EYEGLASSES AND CLIP-ON SUNGLASSES THEREFOR

(76) Inventor: Dean Friedman, 61 Ulster Ave., Atlantic Beach, NY (US) 11509

( * ) Notice: Subject to any disclaimer, the term of this patent is extended or adjusted under 35 U.S.C. 154(b) by 0 days.

(21) Appl. No.: 10/354,394

(22) Filed: Jan. 31, 2003

(65) Prior Publication Data

US 2004/0075805 A1 Apr. 22, 2004

Related U.S. Application Data

(63) Continuation-in-part of application No. 10/273,533, filed on Oct. 21, 2002.

(51) Int. Cl.⁷ .................................................. G02C 9/00
(52) U.S. Cl. ........................................ 351/48; 351/58
(58) Field of Search ............................ 351/47, 48, 57, 351/58

(56) References Cited

U.S. PATENT DOCUMENTS

| | | | |
|---|---|---|---|
| 2,926,563 A | 3/1960 | Lockwood | 351/48 |
| 3,575,497 A | 4/1971 | Leblanc | 351/47 |
| 5,164,749 A | 11/1992 | Shelton | 251/47 |
| D350,359 S | 9/1994 | Friedman | D16/334 |
| 5,477,281 A * | 12/1995 | Boyer | 351/128 |
| 5,801,804 A | 9/1998 | Pennise | 351/44 |
| 5,953,096 A | 9/1999 | Friedman | 351/47 |
| 6,234,627 B1 * | 5/2001 | Agnoli | 351/47 |
| 6,234,628 B1 | 5/2001 | Friedman | 351/48 |
| 6,290,353 B1 * | 9/2001 | Chou | 351/47 |
| 6,302,538 B1 | 10/2001 | Friedman | 351/48 |
| 6,550,912 B2 * | 4/2003 | Vitaloni | 351/47 |

* cited by examiner

Primary Examiner—Huy Mai
(74) Attorney, Agent, or Firm—Robert L. Epstein; Epstein Drangel Bazerman & James LLP

(57) ABSTRACT

The eyeglasses frame is provided with spaced, oppositely extending, coplanar recesses. The lens sections of the sunglasses are provided with first and second oppositely directed collinear protrusions. An enclosed spring bridge mechanism moveably connects the lens sections. The spring bridge mechanism permits the lens sections to be moved toward each other, compressing the spring, to insert the protrusions into the recesses. The spring urges the lens sections away from each other, seating the protrusions into the recesses, to mount the sunglasses on the eyeglasses frame.

17 Claims, 8 Drawing Sheets

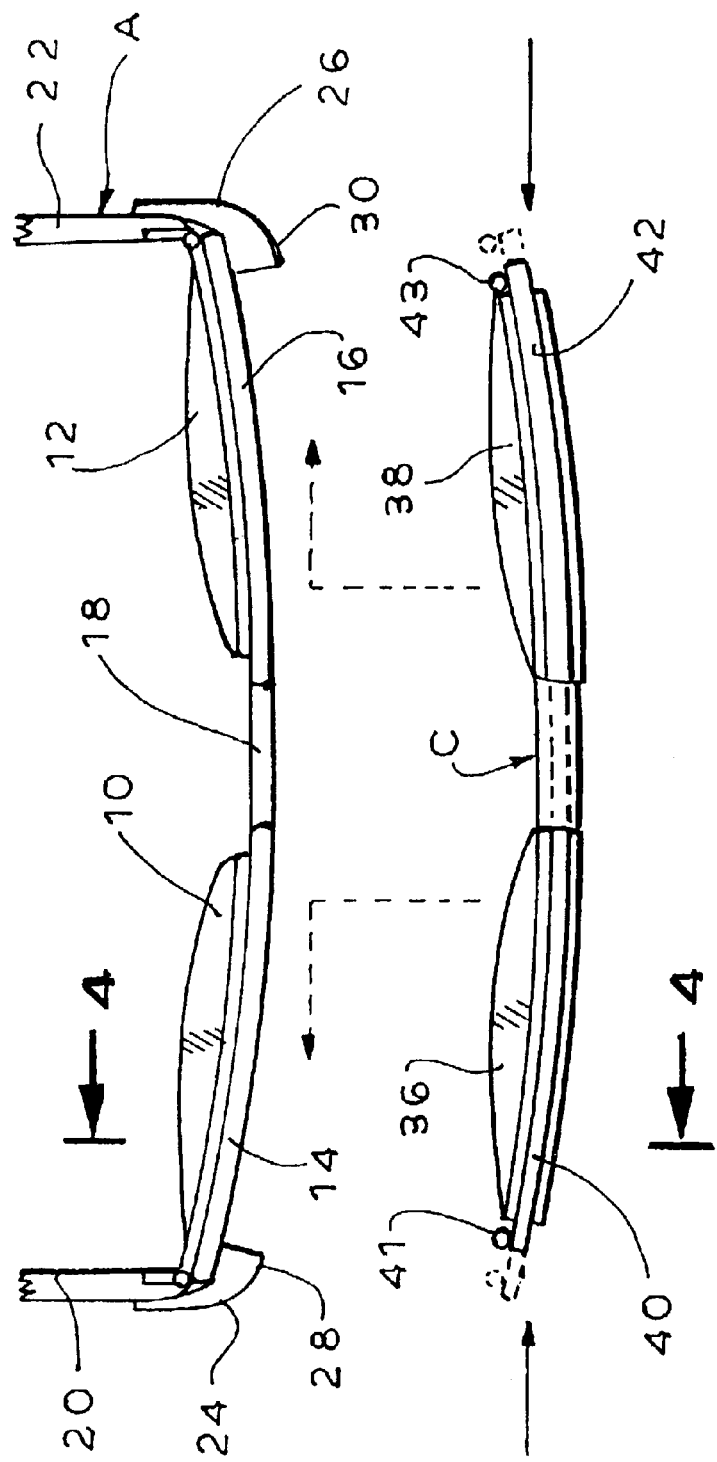

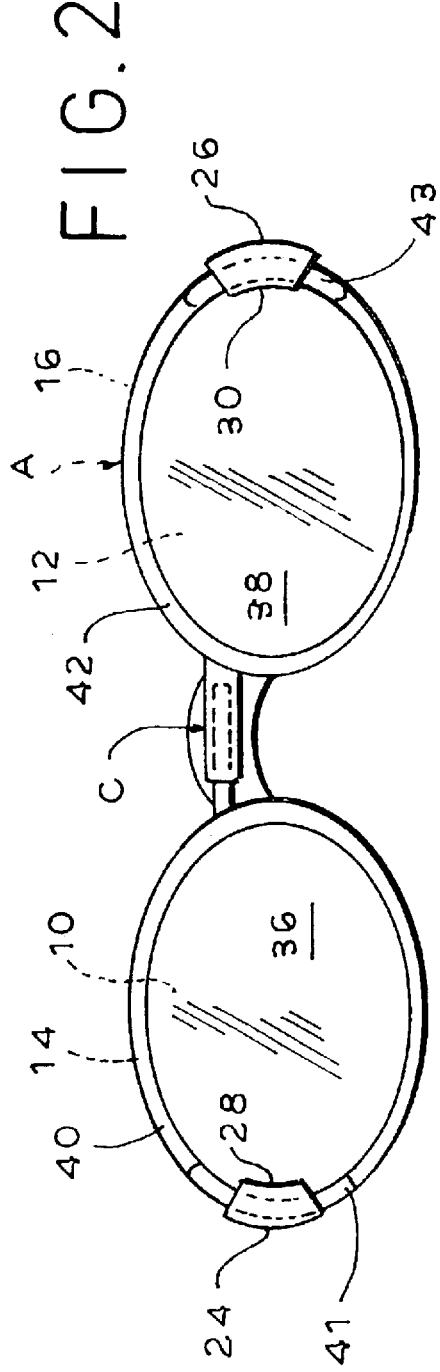
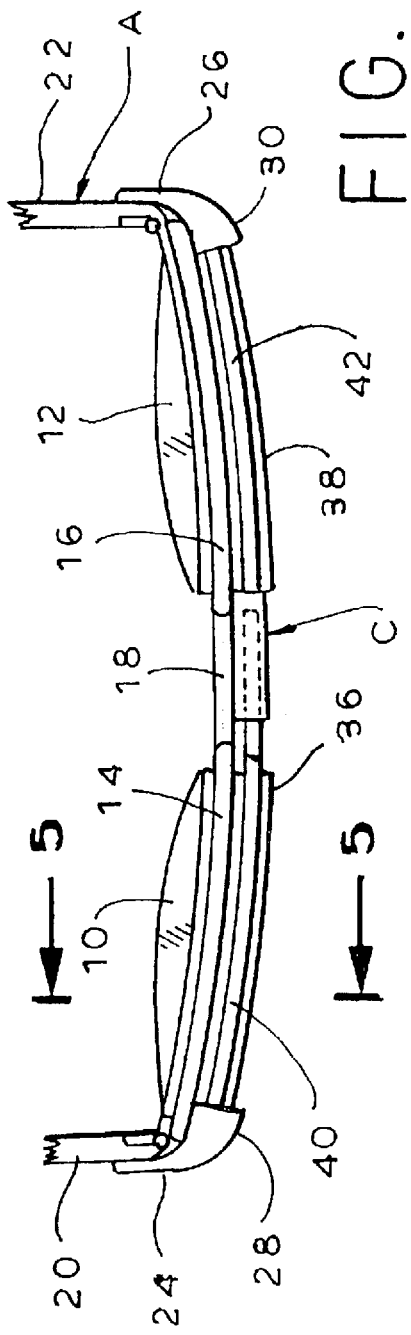

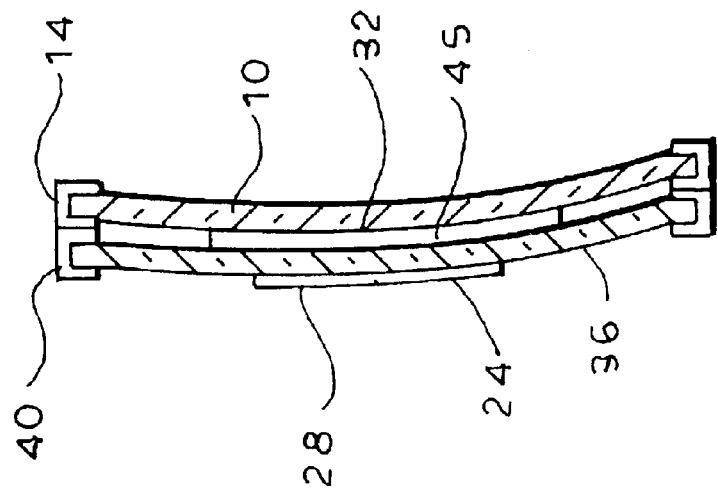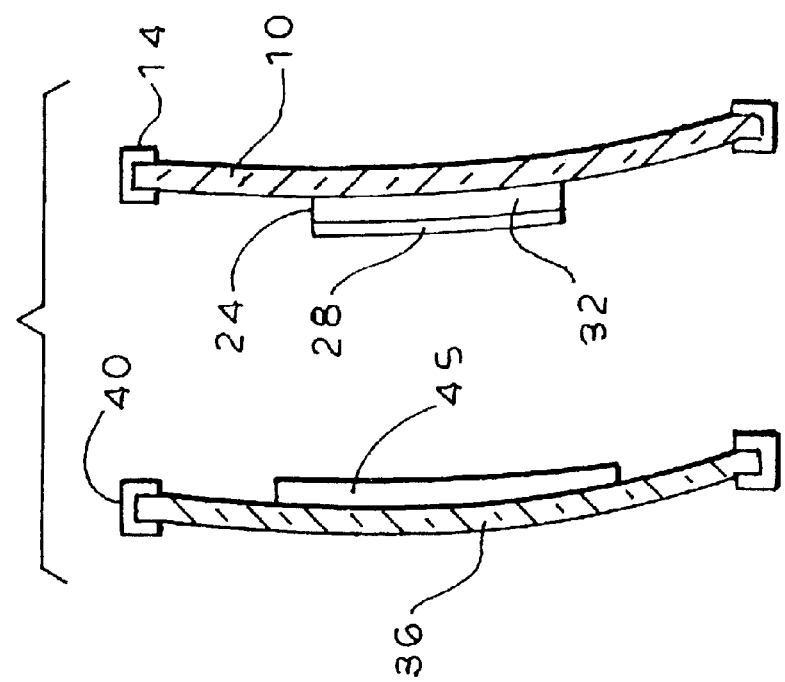

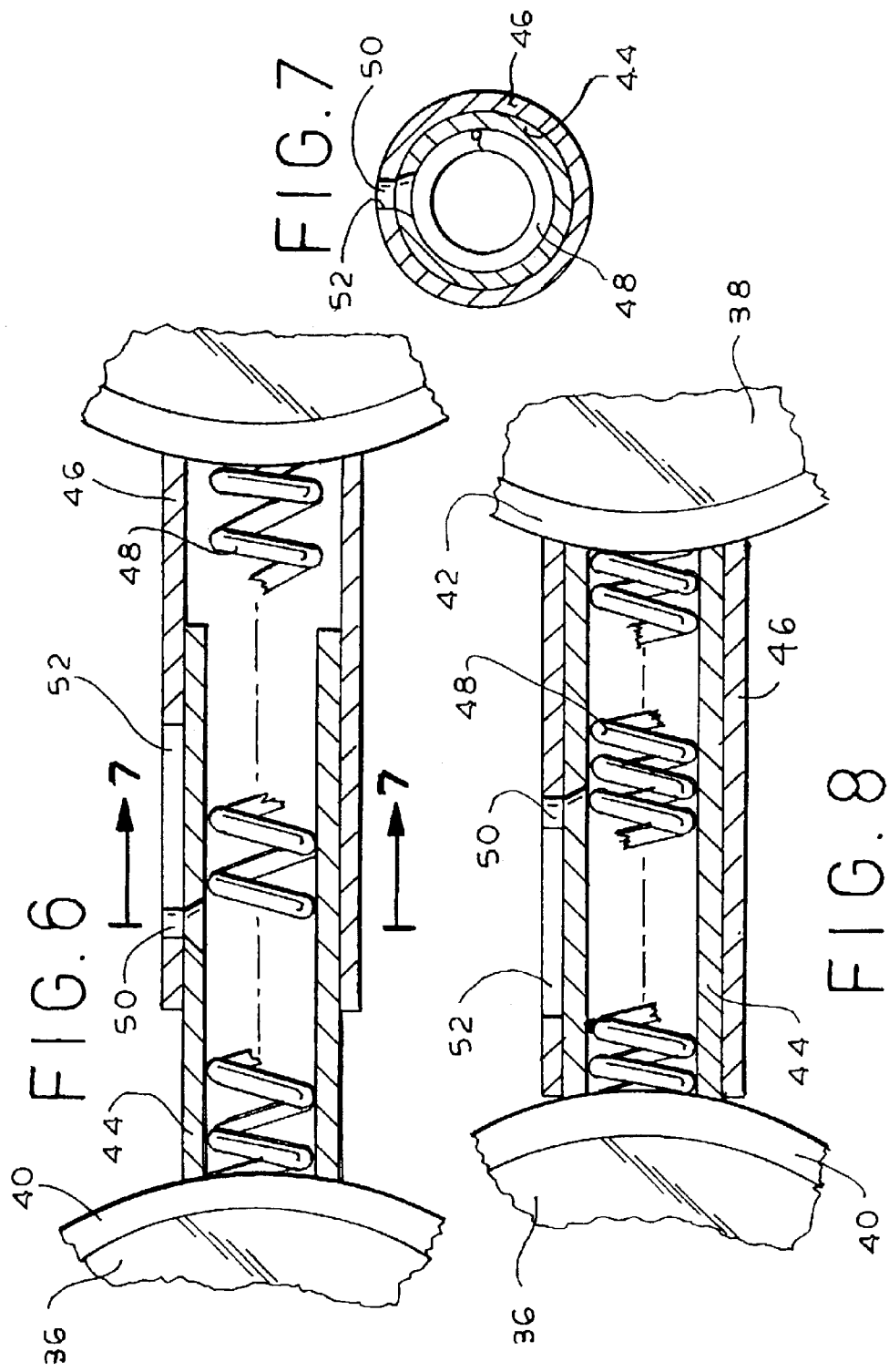

EYEGLASSES AND CLIP-ON SUNGLASSES THEREFOR

This application is a continuation-in-part of copending Application Ser. No. 10/273,533 filed Oct. 21, 2002 in the name of Dean Friedman and entitled "Eyeglasses and Clip-On Sunglasses Therefor" upon which priority is claimed.

The present invention relates to clip-on sunglasses and more particularly to specially designed eyeglasses adapted to receive clip-on sunglasses and to the clip-on sunglasses therefor.

Clip-on sunglasses consist of a metal or plastic frame that carries a pair of light attenuating plastic or glass lenses. A mechanism is provided to removably mount the clip-on sunglasses.

In order to be commercially acceptable, the clip-on sunglasses must be light in weight, reasonably rugged and relatively inexpensive. They must also be easy to mount on and remove from eyeglasses. Further, the clip-on sunglasses must mount without damaging the eyeglasses, particularly the lenses.

One common type of mounting mechanism is a clamp that is attached to the bridge of the sunglasses. The clamp includes pairs of opposing prongs which are spring-loaded toward each other so as to retain the lenses of the eyeglasses between the prongs. Examples of this clamp-type mechanism are disclosed in U.S. Pat. No. 3,575,497 issued Apr. 20, 1971 to Leblanc, U.S. Pat. No. 5,164,749 issued Nov. 17, 1992 to Shelton and U.S. Pat. No. Des 350,359 issued Sep. 6, 1994 to Friedman.

However, clamp-type mechanisms have their disadvantages. The prongs must clamp tightly to the lenses, potentially scratching the lenses. The mechanism may obstruct the view partially. Moreover, the clamp-type mechanisms have several inter-engaging parts which must be fabricated precisely and assembled, making the mechanism relatively expensive and sometimes unreliable.

In order to overcome the drawbacks of the clamp-type mechanisms, a mechanism was developed for mounting clip-on sunglasses that does not contact or clamp the lenses of the eyeglasses and therefore cannot scratch them. This type of mechanism utilizes one or more sets of exposed spring-loaded prongs. The prongs are movably or flexibly mounted such that they can be moved against a spring force, for insertion between spaced portions of the eyeglasses frame. The spring force causes the prongs to frictionally engage the eyeglasses frame. Because the prongs only engage the frame, the lenses of the eyeglasses cannot be scratched. An example of such a mechanism is disclosed in U.S. Pat. No. 5,953,096 entitled "Universal Center Bridge Mounting Mechanism for Clip-On Sunglasses" issued to me on Sep. 14, 1999.

Another type of clip-on sunglasses, such as is disclosed in Lockwood U.S. Pat. No. 2,926,563, consists of mirror image frame sections, each of which retains a lens. The frame sections are connected together by a bridge mechanism which includes an exposed metal coil spring. The mechanism permits the frame sections to move away from each other. Each frame section, at its outer extremity, is provided with a set (typically two or three) of eyeglasses frame engaging prongs protruding from the plane of the lens sections. When the frame sections are moved away from each other, against the force of the spring, the eyeglasses frame can be inserted between the prongs. Releasing the frame sections permits the spring to move frame sections back toward each other, such that the eyeglasses frame is securely retained between the prongs.

One problem inherent in that type of spring bridge mechanism is that the coil spring is exposed. Aside from being unsightly, this is undesirable because bits of solid debris and other particulate foreign matter can lodge between the coils and jam the mechanism or distort the spring. Liquid, such as rain or sweat, can enter the mechanism resulting in rusting or deterioration of the parts. Further, the skin, hair and eyebrows of the user are not protected from the exposed spring.

I therefore developed an improved spring bridge mechanism that overcomes that problem by enclosing the coil spring within a slender tubular enclosure. The enclosure isolates the spring from the skin and hair of the wearer and prevents debris and liquids from reaching the spring.

The enclosure serves the additional purpose of cooperating with the bridge elements of the frame sections to keep the frame sections in the proper plane. This is achieved by one or more slots in the enclosure which cooperate with protrusions on the bridge elements to maintain the frame sections in the same plane. The interior wall of the enclosure also provides an end surface for the spring to abut.

Aside from isolating the spring from the environment, the enclosure enhances the appearance of the clip-on sunglasses by hiding the unsightly spring. Preferably, the enclosure is made of the same material and finish as the bridge elements and frame, resulting in a mechanism which is much less conspicuous than an exposed spring.

I received U.S. Pat. Nos. 6,234,628 and 6,302,538, issued May 22, 2001 and Oct. 16, 2001, respectively, for my enclosed spring bridge mechanism. The mechanisms disclosed in those patents, as well as the mechanism disclosed in Lockwood, require sets of protruding prongs mounted on opposite sides of the lens sections of the sunglasses to receive the eyeglasses frame. However, the prongs on the lens sections are unsightly. Further, because the prongs must protrude out of the plane of the sunglasses, they tend to catch on other objects and to make it difficult to store the sunglasses.

In the present invention, I avoid the need for protruding prongs on the sunglasses. This is accomplished by providing spaced engaging parts on the eyeglasses frame and mounting the sunglasses by inserting the lens retaining frame sections of the sunglasses between the engaging parts.

I am aware of U.S. Pat. No. 5,801,804, issued Sept. 1, 1998 to Robert Pennise, entitled "Linearly Adjustable Sunglasses" that discloses clip-on sunglasses that do not require protruding prongs. However, Pennise's clip-on sunglasses are designed to mount between the temple pieces of the eyeglasses frame, and hence behind the lenses of the eyeglasses, making the sunglasses uncomfortable to wear and hence impractical. Moreover, Pennise's sunglasses require a second bridge part, spaced from the spring bridge, to maintain the lenses in the same plane.

It is therefore a prime object of the present invention to provide eyeglasses and clip-on sunglasses therefor in which the clip-on sunglasses have no protruding prongs on the lens sections.

It is another object of the present invention to provide eyeglasses and clip-on sunglasses therefor in which the eyeglasses frame is modified in a simple and inexpensive manner to accept the clip-on sunglasses.

In accordance with one aspect of the present invention, a combination of eyeglasses and clip-on sunglasses adapted to be removably mounted on the eyeglasses is provided. The eyeglasses includes a frame. The frame has spaced engaging means on the frame. The clip-on sunglasses includes first and second lens sections. Means are provided for connecting the lens sections for movement between a remote position and a proximate position. Spring means are provided for urging the lens sections toward the remote position. The lens sections are inserted and retained between the spaced engaging means to retain the clip-on sunglasses on the eyeglasses frame.

The engaging means includes first and second engaging parts. The engaging parts extend from spaced locations on the eyeglasses frame.

Each of the engaging means defines a channel adapted to receive a portion of one of the lens sections. The channel has a shape which corresponds to the shape of the portion of the lens section adapted to be received therein.

The connecting means includes a first tubular member, associated with one of the lens sections, and a second tubular member, associated with the other of the lens sections. The spring means is operably connected between the tubular members.

The first tubular member is at least partially received within the second tubular member. The spring means is at least partially received within the first tubular member.

Means are provided for preventing relative rotation between the tubular members. Those means include a protrusion extending from the surface of one of the tubular members and a protrusion receiving slot on the other tubular member. The slot is elongated in the direction of movement of said lens sections.

Cushion means are associated with the corner of each of the lens sections to prevent scratching of the eyeglass lenses as the sunglasses are mounted. The cushion means includes a strip of cushion material with a circular, a semi-circular or "L" shaped cross-sectional shape.

In accordance with another aspect of the present invention, clip-on sunglasses are provided including first and second lens sections. Means are provided for connecting the lens sections for movement between a remote position and a proximate position. Spring means urge the lens sections toward the remote position. The connecting means includes means for maintaining the lens sections in substantially the same plane.

The connecting means includes first and second tubular members. The spring means is operably interposed between the tubular members. The first tubular member is at least partially received within the second tubular member. The spring means is at least partially received within the first tubular member.

The maintaining means includes a protrusion on one of the tubular members and a protrusion receiving slot on the other of the tubular members. The slot is elongated in the direction of lens section movement.

The connecting means comprises the bridge of the sunglasses. The tubular members completely enclose the spring.

The sunglasses lens sections include first and second rims, respectively. The first enclosure is connected to the first rim. The second enclosure is connected to the second rim.

Means are provided for removably mounting the sunglasses to eyeglasses. The mounting means includes spaced engaging parts extending from the eyeglasses.

Cushion means are associated with the corner of each of the lens sections. The cushion means includes a strip of cushion material with a circular, semi-circular or "L" shaped cross-sectional shape.

In accordance with another aspect of the present invention, eyeglasses adapted to receive clip-on sunglasses are provided. The eyeglasses include a frame and first and second lenses attached to the frame. First and second engaging parts extend from the frame from spaced locations thereon. Clip-on sunglasses are adapted to be received between the engaging parts.

The frame includes hingeably mounted temple pieces and sections for mounting the temple pieces. The engaging parts are mounted proximate the sections.

In accordance with another aspect of the present invention, a combination of eyeglasses and clip-on sunglasses adapted to be removably mounted on the eyeglasses is provided. The eyeglasses includes a frame. The frame has first engaging means extending from the frame. The clip-on sunglasses includes first and second lens sections. Means are provided for connecting the lens sections for movement between a remote position and a proximate position. Spring means urge the lens sections toward the remote position. Second engaging means are provided on the clip-on sunglasses. The lens sections can be moved toward the proximate position to align the first and the second engaging means. The spring means urges the lens sections toward the remote position to inter-engage the first and the second engaging means to retain the sunglasses on the eyeglasses.

The first engaging means includes first and second engaging parts. The engaging parts extend from spaced locations on the eyeglasses frame.

One of the first and second engaging means includes a protrusion. The other of the first and second means includes a protrusion receiving recess. Preferably, the protrusion comprises a shaft. The shaft may be provided with an enlarged head.

Cushion means are associated with the corner of each of the lens sections. The cushion means includes a strip of cushion material with a circular, a semi-circular or "L" shaped cross-sectional shape.

In accordance with another aspect of the present invention, eyeglasses and clip-on sunglasses adapted to be removably mounted thereon, are provided. The eyeglasses include a frame. The frame has first and second spaced, substantially oppositely extending recesses. The clip-on sunglasses include first and second lens sections. First and second protrusions are provided, each extending outwardly from a different one of the lens sections. Means are provided for connecting the lens sections for movement between a remote position and a proximate position. Spring means are provided for urging the lens sections toward the remote position, such that the protrusions on the lens sections are received within the recesses, to mount the clip-on sunglasses on the eyeglasses.

The first and second protrusions preferably extend in substantially the same plane as the lens sections of the sunglasses and are substantially collinear as well as substantially coplanar. Preferably, the recesses are also substantially collinear and substantially coplanar.

The connecting means includes a first tubular member associated with one of the lens sections and a second tubular member associated with the other of the lens sections. The spring means is operably interposed between the tubular members.

The first tubular member is at least partially received within the second tubular member. The spring means is at least partially received within the first tubular member. Means are provided for preventing relative rotation between the tubular members.

The rotation preventing means includes a protrusion extending from the surface of one of the tubular members. A protrusion receiving slot is provided in the other of the tubular members. The slot is elongated in the direction of movement of the lens sections.

In accordance with another aspect of the present invention, clip-on sunglasses are provided, including first and second lens sections. Means are provided for connecting the lens sections for movement between a remote position and a proximate position. Spring means urge the lens sections toward the remote position. First and second protrusions extend in substantially opposite directions, from the first and second lens sections, respectively.

The first and second protrusions extend substantially in the plane of the lens sections. They are preferably substantially coplanar and substantially collinear.

The sunglasses are designed for mounting on eyeglasses. The eyeglasses include first and second recesses for removably receiving the first and protrusions, respectively.

In accordance with another aspect of the present invention, eyeglasses adapted to receive clip-on sunglasses are provided. The eyeglasses include a frame. First and second lenses are attached to the frame. Spaced, substantially oppositely extending recesses are provided in the frame. The clip-on sunglasses are adapted to be received between the recesses.

The frame has hingeably mounted temple pieces and sections for mounting the temple pieces. The recesses are situated in the sections.

The recesses are preferably substantially collinear and substantially coplanar.

The eyeglasses arc designed for use with sunglasses. The sunglasses have first and second protrusions adapted to be received in the first and second recesses, respectively. The protrusions are substantially collinear and substantially coplanar.

To these and such other objects that may hereinafter appear, the present invention relates to eyeglasses and clip-on sunglasses therefor, as set forth in detail in the following specification, recited in the annexed claims and illustrated in the accompanying drawings, wherein like numerals refer to like parts, and in which:

FIG. 1 is a top exploded view of a first preferred embodiment of the eyeglasses and clip-on sunglasses of the present invention;

FIG. 2 is a front view of the first preferred embodiment of the eyeglasses with the clip-on sunglasses mounted thereon;

FIG. 3 is a top view of the eyeglasses and clip-on sunglasses of FIG. 2;

FIG. 4 is a cross-sectional view taken along line 4—4 of FIG. 1;

FIG. 5 is a cross-sectional view taken along line 5—5 of FIG. 3;

FIG. 6 is an enlarged cut-away view of the spring in its normal state; view taken along line 6—6 of FIG. 5;

FIG. 7 is a cross-sectional view taken along line 7—7 of FIG. 6;

FIG. 8 is a view similar to that of FIG. 6, but showing the spring in its compressed state;

Figure 9:
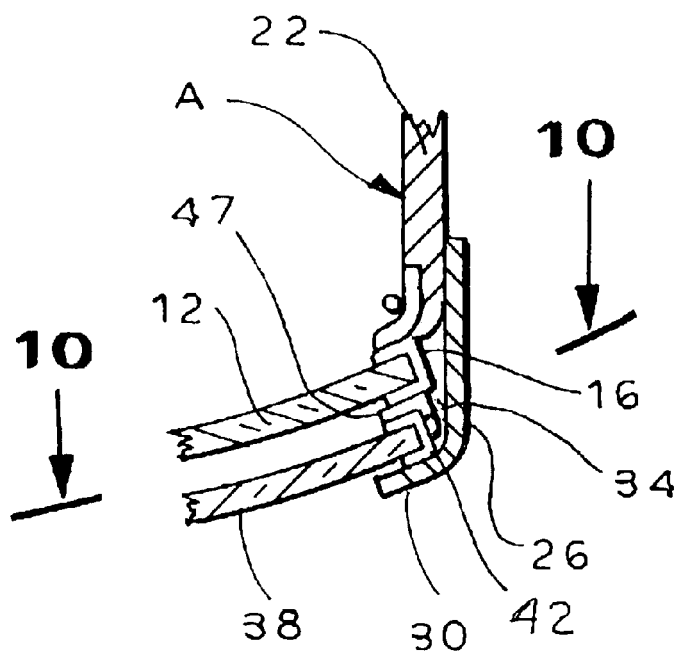
FIG. 9 is an enlarged top cross-sectional view of the corner of the first preferred embodiment of the eyeglasses and sunglasses showing one of the engaging parts.

As seen in the drawings, the present invention includes specially designed eyeglasses frames, generally designated A, and clip-on sunglasses, generally designated B, adapted to be removably mounted to eyeglasses frame A.

Frames A are conventional in every respect except for engaging means present on the frame. The engaging means are situated at spaced locations on the frame. Frame A includes first and second lenses 10, 12 and first and second lenses retaining rims 14, 16 connected by a bridge 18. Hingeably mounted temple pieces 20, 22 extend rearwardly from rims 14, 16, respectfully.

In this preferred embodiment, the engaging means take the form of engaging parts 24; 26 that are mounted on either side of the frame, on rims 14, 16, respectively, proximate the temple piece hinges. Parts 24, 26 each have a generally "L" shape cross-sectional configuration, see FIG. 9, with the forward most portion 28, 30 being generally parallel to but spaced from the eyeglass lens 10, 12 so as to form a recess or channel 32, 34 between the eyeglass rims 14, 16 and portions 28, 30 of the engaging parts 24, 26, respectively, as best seen in FIG. 4. Each channel 32, 34 is preferably formed to have a shape which corresponds to the shape of the portion of the lens section of the sunglasses which will be received therein.

Clip-on sunglasses B consist of first and second lens sections 36, 38. Sections 36, 38 may include lenses and lens retaining rims 40, 42 to retain the lenses. Although rims 40, 42 are shown as surrounding the lenses, which is often the case, many sunglasses have half rims or no rims at all. Any of these structures will work well in my device.

Lens sections 36, 38 are connected by a spring bridge, generally designated C. When rims 40, 42 are present, as shown, bridge C is attached between the rims. However, the bridge could be attached directly to the lenses, if desired.

As best seen in FIGS. 6, 7 and 8, spring bridge C comprises a first tubular member 44 fixed to rim 40 of lens 36, a second tubular member 46 fixed to rim 42 of lens 38 and a spring 48 operably interposed between the lenses. Spring 48 is at least partially received within member 44. Member 44 is at least partially received within member 46. In this manner, spring 48 is always completely enclosed.

Spring bridge C connects the sunglasses lens sections 36, 38 for movement between a normal, remote position, as seen in phantom in FIG. 1, wherein spring 48 is not compressed, as seen in FIG. 6, and a proximate position, as seen in solid in FIG. 1, wherein spring 48 is compressed, as seen in FIG. 8. Lens sections 36, 38 of sunglasses B are moved toward each other, to the proximate position, compressing spring 48, such that the sunglasses can be inserted between engaging parts 24, 26. The lens sections are then released, such that the outer most portions of the lenses (or the rims, if present) are received in channels 32, 34 defined by engaging parts 24, 26. Spring 48 urges the lens sections outwardly towards the remote position, to seat the lens sections in the channels.

Channels 32, 34 are formed with a shape that corresponds to the shape of the portions of lens sections 36, 38 received therein. This assures that the lens sections 36, 38 of sunglasses B will always correctly align with frame A when the sunglasses are mounted.

Means are provided to maintain the lens sections 36, 38 of sunglasses B in the same plane as they are moved between remote and proximate positions. This means prevents relative rotation between tubular members 44, 46. It takes the form of a protrusion 50, extending outwardly from the surface of member 44, that is received in a slot 52 in member 46. Slot 52 is elongated along the axis of the spring bridge, in the direction of the movement of the sunglasses lenses.

Figure 10:
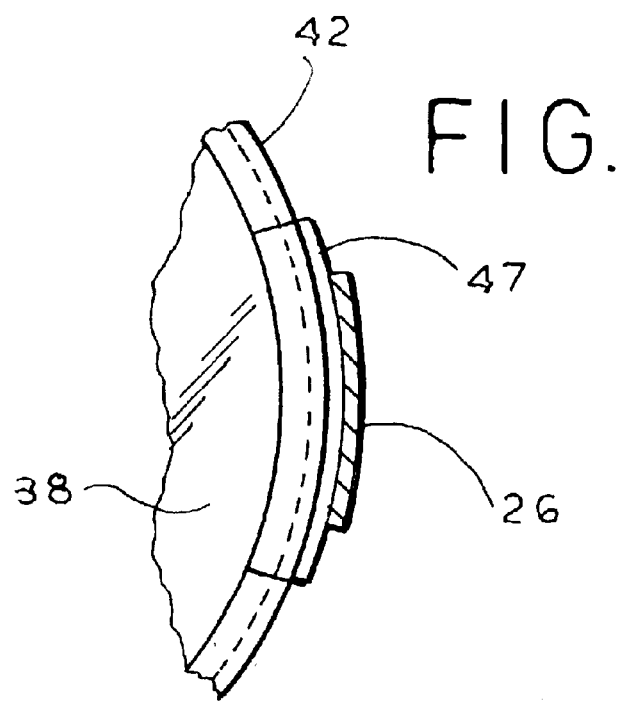
FIG. 10 is a rear fragmentary view taken along line 10—10 of FIG. 9.
Figure 11:
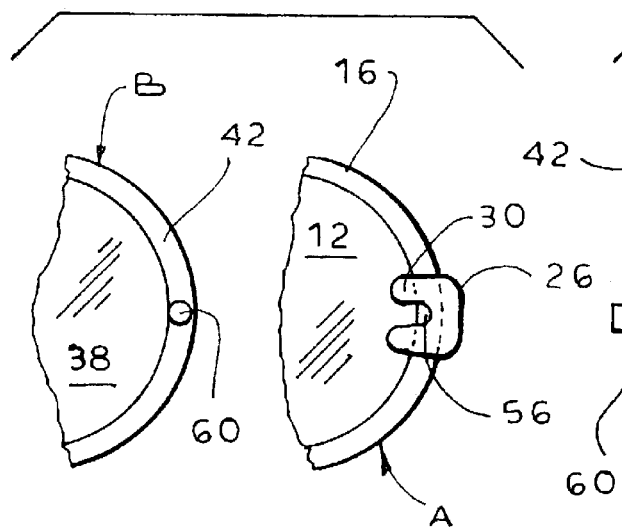
FIG. 11 is a front sectional exploded view of portions of the eyeglasses and sunglasses of a second preferred embodiment of the present invention.
Figure 12:
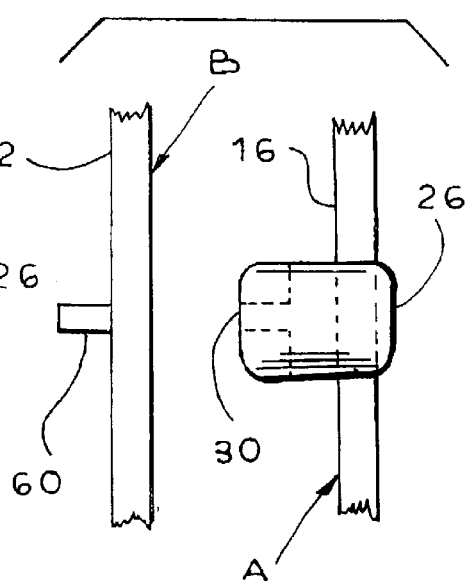
FIG. 12 is an enlarged side exploded view of the portions shown in FIG. 11.
Figure 13:
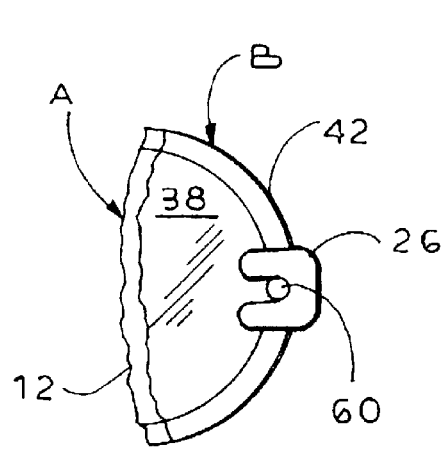
FIG. 13 is a front fragmentary view of portions of the eyeglasses and sunglasses of the second preferred embodiment showing the sunglasses mounted on the eyeglasses.
Figure 14:
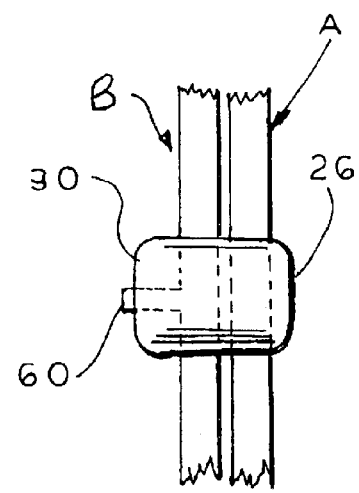
FIG. 14 is an enlarged side view of portions of the eyeglasses and sunglasses of the second preferred embodiment showing the sunglasses mounted on the eyeglasses.
Figure 15:
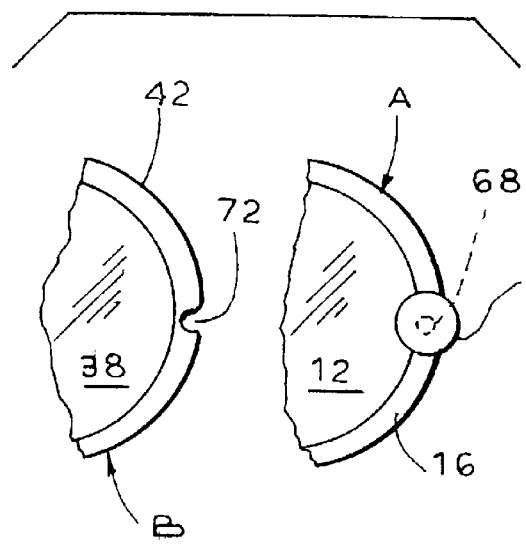
FIG. 15 is a front fragmentary exploded view of portions of the eyeglasses and sunglasses of a third preferred embodiment of the present invention.
Figure 16:
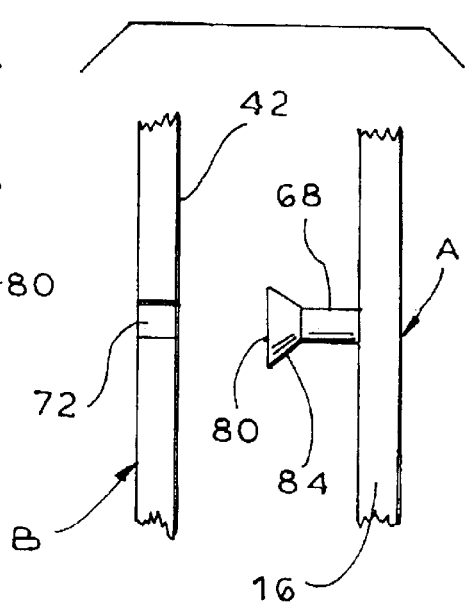
FIG. 16 is an enlarged exploded side view of the portions shown in FIG. 15.
Figure 17:
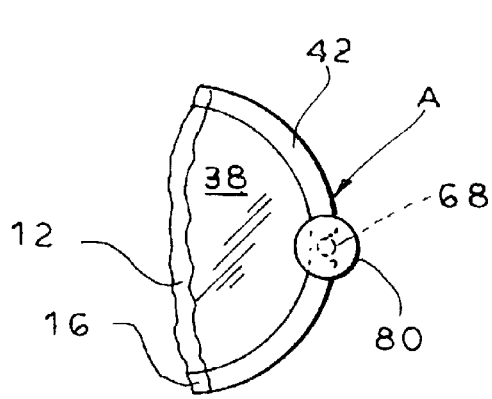
FIG. 17 is a front fragmentary view of portions of the eyeglasses and sunglasses of the third preferred embodiment showing the sunglasses mounted on the eyeglasses.
Figure 18:
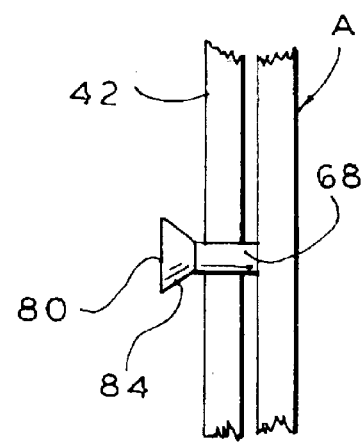
FIG. 18 is an enlarged side view of portions of the eyeglasses and sunglasses of the third preferred embodiment showing the sunglasses mounted on the eyeglasses.

As illustrated in FIG. 1, sunglasses B are mounted to the front of eyeglasses frame A by moving the lens sections 36, 38 of sunglasses B toward the proximate position, compressing spring 48 as protrusion 50 moves along slot 52 to the right, as seen in FIG. 8. Sunglasses B are then placed adjacent the front surface of the eyeglasses frame such that the outermost portions of lens sections 36, 38 of the sunglasses B are aligned with the arcuate channels 32, 34 of engaging parts 24, 26. Releasing the lenses of sunglasses B allows spring 48 to urge the lens sections toward the remote position, such that the outermost portions of the lens sections are received in channels 32, 34, as seen in FIGS. 4 and 5, as protrusion 50 moves along slot 52 toward the left, as seen in FIG. 6. Since the shape of channels 32, 34 corresponds to the shape of the received portions of the sunglasses lens sections, the spring force causes sunglasses B to seat in correct alignment with the eyeglasses, as seen in FIGS. 2 and 3, as well as FIGS. 9 and 10. As seen in the figures, the outermost portions of the lens sections are curved and the channels are arcuate with a corresponding curvature.

In order to prevent the corners of the sunglasses lens sections from scratching the lenses of the eyeglasses as they are inserted into the channels defined by the engaging parts, a cushion strip can be fixed on or proximate to the corner of each lens section. The cushion strip may be made of any resilient material such as rubber or plastic.

The cushion strip may have a circular or semi-circular cross-section, such as strips 41 and 43, seen in FIG. 1 or an "L" shaped cross-section, such as strips 45 and 47 seen in FIGS. 4, 5, 9 and 10. The cushion strips will deform slightly as the lens sections are inserted into the engaging parts.

In a second preferred embodiment, as illustrated in FIGS. 11–14, engaging parts 24, 26 are modified to be somewhat smaller from top to bottom as compared to those of the first preferred embodiment and to include laterally extending recesses on their front portions. Only one part 26 with a recess 56 on its front portion 30 is shown, the other part 24 being the mirror image. The rims of the sunglasses are provided with shaft-like protrusions adapted to be received within the recesses, respectively. Only a portion of one lens section with a protrusion 60 is shown, the other lens section being the mirror image. Each of the protrusions is received in the respective recess with the outermost portion of the lens section received under the forward section of the engaging part. In this embodiment, the channels 32, 34 defined by the engaging parts, need not be of any particular shape, as the protrusion/recess sets properly align the sunglasses on the eyeglasses frames.

In a third preferred embodiment, as seen in FIGS. 15–18, the protrusions and recesses are reversed, with shaft-like protrusions extending forwardly from the rims of eyeglasses frame A and the recesses being formed in the outermost portions of the sunglasses lens sections. One eyeglasses frame section with a protrusion 68 and one sunglasses lens section with a recess 72 is shown, the other set being the mirror image. In this embodiment, the protrusions are preferably provided with an enlarged head 80. The enlarged heads of the protrusions have inclined interior surfaces 84 to guide the lens sections to receive the shafts. As in the previous embodiment, alignment between the sunglasses and the eyeglasses frame is assured by cooperation between the protrusions and recesses.

Figure 21:
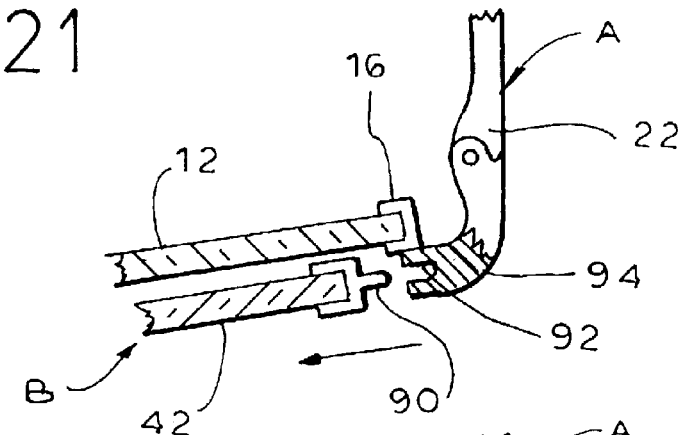
FIG. 21 is a view similar to FIG. 20 but showing the sunglasses in the proximate position.
Figure 20:
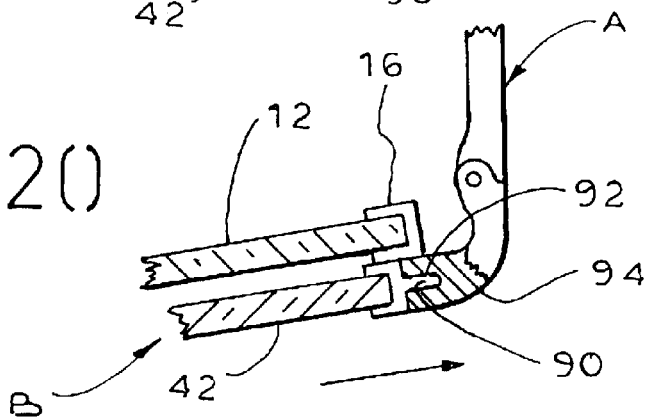
FIG. 20 is a top fragmentary view of the portions of the eyeglasses and sunglasses taken along line 20—20 of FIG. 19.
Figure 19:
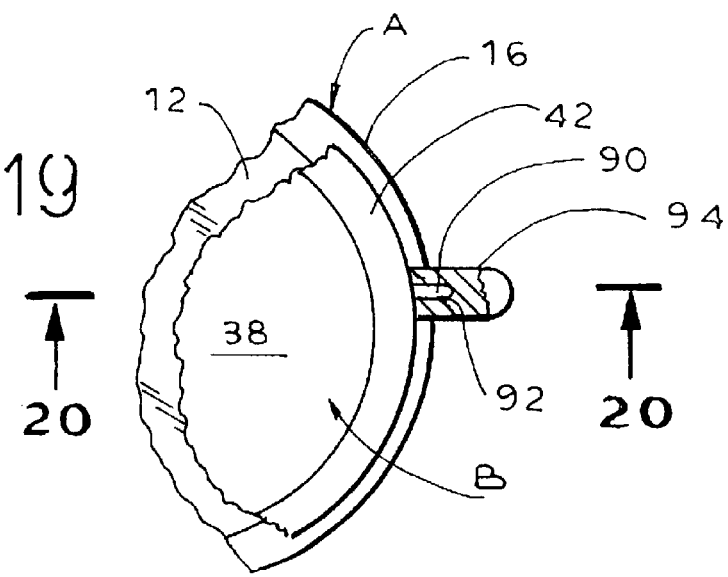
FIG. 19 is a front fragmentary view of portions of the eyeglasses and sunglasses of a fourth preferred embodiment of the present invention.

In a fourth preferred embodiment, illustrated in FIGS. 19–21, each side of the sunglasses B is provided with a shaft-like protrusion 90 mounted on the rim 42 of the sunglasses, similar to protrusion 60 in the embodiment of FIGS. 11–14. However, in this preferred embodiment, protrusions 90 extend outwardly from rim 42, in opposite directions, substantially in the plane of the sunglasses, instead of forwardly, as do protrusions 60 in the second preferred embodiment. Hence, in this embodiment, the protrusions are substantially collinear and substantially coplanar.

A recess 92, adapted to receive protrusion 90, is situated in the portion 94 on each side of the frame of eyeglasses A. Each frame portion 94 of eyeglasses A is connected to a different one of the temple pieces 20, 22 by the hinge. Rim 16 of eyeglasses A is fixed to the rear surface of each of the portions 94, as seen in FIGS. 20 and 21. Protrusions 90 are received in recesses 92 by moving the sunglass rims 40, 42 towards the proximate position, as seen in FIG. 21, aligning the sunglasses in front of eyeglasses A and releasing the sunglasses such that the spring 48 in spring bridge C moves rims 40, 42 apart, seating each of the protrusions 90 in a different one of the recesses 92, as seen in FIGS. 20 and 21, so as to secure the sunglasses on the eyeglasses.

In this embodiment, recesses 92 are spaced apart by a distance that is somewhat greater than the width of the sunglasses when the lens sections are in the proximate position. This enables the sunglasses to be inserted between frame portions 94. Recesses 92 extend in substantially opposite directions, but are substantially collinear and substantially coplanar.

It will now be appreciated that the present invention relates to eyeglasses and clip-on sunglasses therefor wherein the sunglasses do not require sets of protruding prongs to engage the eyeglasses frame. The lens sections of the sunglasses are spring-loaded toward the remote position such that they can be moved toward each other to compress the spring and be inserted between spaced engaging parts on the front of the eyeglasses frame. Once released, the spring urges the lens section of the sunglasses outwardly into engagement with the engaging parts on the eyeglasses frame to mount the sunglasses.

In one preferred embodiment, the engaging parts define channels for receiving the lens sections of the sunglasses. The channels are shaped to correspond with the shape of the lens sections to assure correct alignment of the sunglasses on the eyeglasses frames. In the other preferred embodiments, first and second engaging means, in the form of protrusion and recess sets, cooperate to retain and align the sunglasses on the eyeglasses frames. In the most preferred embodiment, the protrusions in the plane of the sunglasses so as to be received in the protrusion receiving recesses situated in spaced locations in the eyeglass frame.

While only a limited number of preferred embodiments have been disclosed for purposes of illustration, it is obvious that many variations and modifications could be made thereto. It is intended to include all of these variations and modifications that fall within the scope of the present invention, as defined by the following claims:

I claim:

1. In combination, eyeglasses and clip-on sunglasses adapted to be removably mounted thereon, said eyeglasses including a frame, said frame comprising first and second spaced, substantially oppositely extending recesses, said clip-on sunglasses comprising first and second lens sections, first and second protrusions, each extending outwardly from a different one of said lens sections, means for connecting said lens sections for movement between a remote position and a proximate position, and spring means for urging said lens sections toward said remote position, such that said protrusions on said lens sections are received within said recesses, to mount said clip-on sunglasses on said eyeglasses.

2. The combination of claim 1 wherein said first and second protrusions extend in substantially the same plane as said lens sections.

3. The combination of claim 1 wherein said protrusions are substantially collinear.

4. The combination of claim 1 wherein each said first and second protrusions are substantially coplanar.

5. The combination of claim 1 wherein said first and second recesses are substantially collinear.

6. The combination of claim 1 wherein said first and second recesses are substantially coplanar.

7. The combination of claim 1 wherein said connecting means comprises a first tubular member associated with one of said lens sections, a second tubular member associated with the other of said lens sections and wherein said spring means is operably interposed between said tubular members.

8. The combination of claim 7 wherein said first tubular member is at least partially received within said second tubular member.

9. The combination of claim 7 wherein said spring means is at least partially received within said first tubular member.

10. The combination of claim 7 further comprising means for preventing relative rotation between said tubular members.

11. The combination of claim 7 further comprising a protrusion extending from the surface of one of said tubular members and a protrusion receiving slot in the other of said tubular members.

12. The combination of claim 11 wherein said slot is elongated in the direction of movement of said lens sections.

13. Clip-on sunglasses comprising first and second lens sections, means for connecting said lens sections for movement between a remote position and a proximate position, spring means for urging said lens sections toward said remote position, and first and second protrusions extending in substantially opposite directions from said first and second lens sections, respectively.

14. The sunglasses of claim 13 wherein said first and second protrusions extend substantially in the plane of said lens sections.

15. The sunglasses of claim 13 wherein said first and second protrusions are substantially coplanar.

16. The sunglasses of claim 13 wherein said first and second protrusions are substantially collinear.

17. The sunglasses of claim 13 for use with eyeglasses, further comprising first and second recesses on said eyeglasses for removably receiving said first and protrusions, respectively.

* * * * *